US006935004B2

(12) United States Patent
Terrill et al.

(10) Patent No.: US 6,935,004 B2
(45) Date of Patent: Aug. 30, 2005

(54) PROPELLOR PULLER DEVICE

(76) Inventors: George Terrill, 2029 Miller Ave., Modesto, CA (US) 95354; Mark C. Jones, 8030 Central Ave., Winton, CA (US) 95388

(*) Notice: Subject to any disclaimer, the term of this patent is extended or adjusted under 35 U.S.C. 154(b) by 98 days.

(21) Appl. No.: 10/650,233

(22) Filed: Aug. 28, 2003

(65) Prior Publication Data

US 2005/0044680 A1 Mar. 3, 2005

(51) Int. Cl.[7] .......... B23P 19/04
(52) U.S. Cl. .......... 29/259; 29/261
(58) Field of Search .......... 29/261, 258, 259, 29/262, 260, 263, 269

(56) References Cited

U.S. PATENT DOCUMENTS

| | | | | | |
|---|---|---|---|---|---|
| 1,062,000 A | | 5/1913 | Hahn | | |
| 1,402,477 A | | 1/1922 | Carradus | | |
| 1,457,795 A | | 6/1923 | Pizzuti | | |
| 1,620,211 A | | 3/1927 | Jerabek | | |
| 2,074,649 A | * | 3/1937 | Herkimer | ..................... | 29/261 |
| 3,846,898 A | | 11/1974 | Kerr | | |
| 3,986,242 A | * | 10/1976 | Kerr | ..................... | 29/261 |
| 6,665,918 B1 | * | 12/2003 | Williams | ..................... | 29/259 |

* cited by examiner

*Primary Examiner*—Robert C. Watson
(74) *Attorney, Agent, or Firm*—Frederick Gotha

(57) ABSTRACT

The invention relates to an improved propellor puller device for pulling a propellor hub from a marine engine. The propellor puller has a hub base member that has a central axis and a multiplicity of puller arms extending radially from the central axis. A threaded bolt threadably engages the hub base member so that rotation of the bolt is translated into axial displacement of the hub base member. Tension members composed of a series of chain links are slidably carried by a respective puller arm and attachable by a hook to a propellor blade. As tension in the tension members increases, the tension members will slide radially inwardly towards the central axis. The bolt carries a live center member that compressively engages the propellor shaft as the hub base member is axially displaced and the live center member allows rotation of the bolt while the live center member is locked rotationally with the propellor shaft; the live center member prevents the centering recess on the propellor shaft from becoming distorted and promotes a uniform distribution of the tension forces acting on the propellor hub to separate the propellor hub from the propellor shaft.

3 Claims, 4 Drawing Sheets

PROPELLOR PULLER DEVICE

FIELD OF THE INVENTION

This invention relates to an improved propellor puller device for removal of a propellor from a propellor shaft of a marine engine.

BACKGROUND OF THE INVENTION

In the service and repair of marine engines, it is desirable to remove the propellor from the propellor shaft without damaging the shaft and, consequently, avoiding the considerable expense associated with the replacement of a propellor shaft. Ordinarily, the propellor shaft is splined and a propellor hub or sleeve is slotted for frictional engagement with the propellor shaft. In some instances, the propellor blade and hub will have a key-way type slot and be tapered for a tight frictional fit; other arrangements utilize a pin that extends through both the propellor shaft and propellor hub. Separation of the propellor shaft and hub in the prior art require external forces applied in opposite directions to the propellor shaft and propellor blades. The propellor blades extend radially from the propellor sleeve and after a period of use in a marine environment, the sleeve becomes tightly locked to the propellor shaft; unbalanced forces tend to bind the hub and shaft and thus aggravate the lock. Expeditious removal of the propellor, therefore, without severe damage to the propellor shaft or components of the engine requires a puller device that applies uniform forces that promote removal while avoiding a binding lock.

There are various types of blade configurations and arrangements for a propellor. Most marine propellers have two or three blades. It would, therefore, be desirable to provide a propellor puller device that can accommodate these various blade numbers, configurations and arrangements. The prior art discloses tension transmitting chain links or flexible chains that engage each of the propellor blades where the chains utilize a hook member that hooks to the propellor blade such that when the chain link is placed in sufficient tension, the propellor is urged from its lock with the propellor shaft. In order to place the chain links in tension and achieve sufficient tension to separate the propellor puller, devices were used that caused rotation to occur in the centering recess of the propellor shaft while transmitting a compression force to the propellor shaft. The compression, however, distorted the centering recess in the end of the propellor shaft and consequently interfered with a uniform force distribution. The prior art discloses devices that utilize a threaded axle that threadably engages a nut member such that rotation of the threaded axle results in a compressive force being applied to the end of the propellor shaft. The conical recess located in the center of the propellor shaft at its end centers the compressive force such that it acts axially along the propellor shaft; rotation of the threaded axle transmits the compressive force through the conical recess and results in the recess becoming distorted. Thus, it is desirable to provide a propellor puller device that permits the compressive force to be transmitted through the recess to the propellor shaft by rotation of the threaded axle member without distorting the centering recess on the propellor shaft.

It is also desirable that the tension forces acting through the chain links are provided uniformly to break the friction lock between the hub of the propellor blades and the splines on the propellor shaft.

It is an object of the present invention to provide a propellor puller device that uniformly distributes the tension forces acting on the propellor hub to separate it from the propellor shaft and to permit compressive engagement with the centering recess of the propellor shaft without distortion of the recess.

SUMMARY OF THE INVENTION

There is, therefore, provided according to the present invention, an improved propellor puller device for pulling a propellor having blades from the propellor shaft of a marine engine where the puller device utilizes a hub base member that has an upper end and a lower end and a central axis and an axially extending bore through the hub that is symmetrical with the central axis. A bolt having a first end and a second end is adapted for carriage by the hub base member within the axially extending bore to permit a translation of rotation of the bolt into axial displacement of the hub base member relative to the bolt. A live center member is carried by the bolt at its first end for compressive engagement with a centering recess located at the center of the propellor shaft. The live center member is so adapted for carriage by the bolt that rotation of the bolt relative to the live center member is permitted although the live center member is compressively induced by friction into fixed rotational relationship relative to the propellor shaft. Intermediate the upper and lower ends of the hub base member, a multiplicity of puller arms are carried in fixed relationship to the hub base member and extend radially therefrom. A plurality of flexible tension members are utilized in conjunction with the puller arms for transmitting axially directed external forces to the propellor blades upon sufficient rotation of the bolt when the live center member compressively engages the propellor shaft and upon continued rotation of the bolt, the hub base member is displaced axially relative to the bolt to place the flexible tension members in tension. The live center member, when sufficiently compressively engaged frictionally with the propellor shaft, ceases to rotate and becomes rotationally locked with the propellor shaft thus permitting the bolt to continue to rotate. Continued rotation of the bolt causes the hub base member to be displaced axially with respect to the bolt and thus increases the tension forces in the flexible tension members.

In the preferred embodiment of this invention, the hub base member has a cylindrically shaped portion and a threaded bore extending axially through the cylindrically shaped portion. The hub base member has four puller arms extending as cantilevers radially of the hub base member and are welded to the cylindrical portion. A threaded bolt engages the internal threads of the hub base member such that rotation of the bolt results in axial displacement of the hub base member relative to the bolt. The radially extending puller arms are so dimensioned and proportioned to permit a chain link to circumferentially engage a puller arm and slide relative to the puller arm as the chain link tension member is placed in tension by rotation of the threaded bolt. The puller arms are sloped such that as the tension in the tension member is increased the chain link is permitted to slide inwardly toward the central axis of the hub base member. In the preferred embodiment, the threaded bolt has a head at its second end for applying an external torque to rotate the bolt; and the hub base member has four radially extending puller arms that are angularly spaced to permit the pulling of a propellor hub having either two or three propellor blades. To offset the torque transferred to the hub base member by rotation of the bolt, a torque lever extends radially from the hub base member for applying an opposing torque when sufficient force is applied so as to prevent rotation of the hub base member as the bolt rotates. Thus, the live center member remains in fixed relationship with the propellor shaft at its centering recess while the bolt continues to rotate thereby allowing axial displacement of the hub base member to increase the tension in the chain link members; the inclination of the puller arms to the central axis allows a chain link to slide inwardly as the tension increases while the compressive force exerted by the bolt remains centered on the propellor shaft thereby uniformly distributing the forces acting on the hub base member to pull it from the propellor shaft.

BRIEF DESCRIPTION OF THE DRAWINGS

These, and other features and advantages, will become appreciated as the same become better understood with reference to the following specification, claims and drawings wherein:

DETAILED DESCRIPTION

Figure 1:
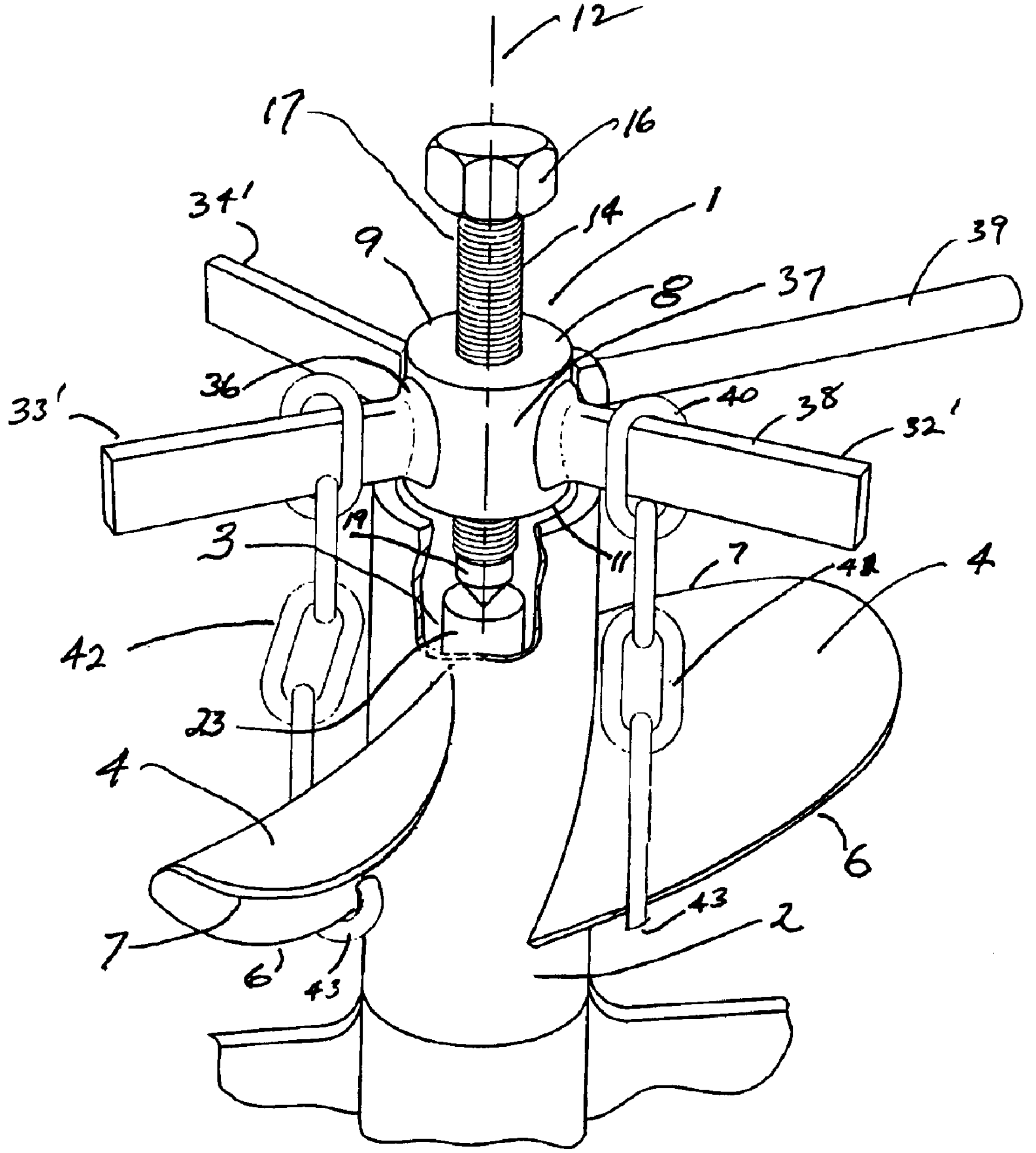
FIG. 1 is a perspective view showing the propellor puller of this invention.

FIG. 1 illustrates the improved propellor pulling device 1 of this invention positioned for applying external forces to a propellor hub 2 of a marine engine (not shown) to remove the hub from the shaft. Propellor hub 2 is shown partially cross sectioned through which the distal end 3 of propellor shaft 23 of the marine engine can be seen. Typically, the distal end 3 of the propellor shaft 23 is splined for engagement with the propellor hub 2 to form a tight frictional lock. With use of an engine over a period of time in a marine environment, the spline connection becomes severely locked by the effects of the water environment such as electrolytic corrosion thus requiring substantial pulling forces to overcome friction and corrosive bonding to unlock the propellor hub from the propellor shaft.

As can be seen in FIG. 1, propellor hub 2 carries propellor blades 4 that extend radially from the propellor hub. The propellor blades have a leading edge 6 and a trailing edge 7. The leading edge provides the geometrical configuration through which forces may be transmitted to the propellor hub 2 when separating the hub from the propellor shaft.

Referring again to FIG. 1, the propellor pulling device 1 has a hub base member 8 that has an upper end 9 and a lower end 11 and a central axis 12. By referring to FIG. 4, it can be seen that hub base member 8 has an axially extending bore 13 that is threaded for threaded engagement with bolt 14 that is also threaded for translational movement relative to the hub base member 8. Although the hub base member and bolt are shown to be threaded in FIG. 4, the translation of rotational motion of the bolt resulting in axial displacement relative to the bolt by the hub base member may be achieved by other forms of translational engagement between the bolt and hub base member.

In FIG. 1, bolt 14 is shown to have a hexagonal head 16 for transmitting a torque to the bolt 14 at the upper end 17 of the bolt.

Figure 4:
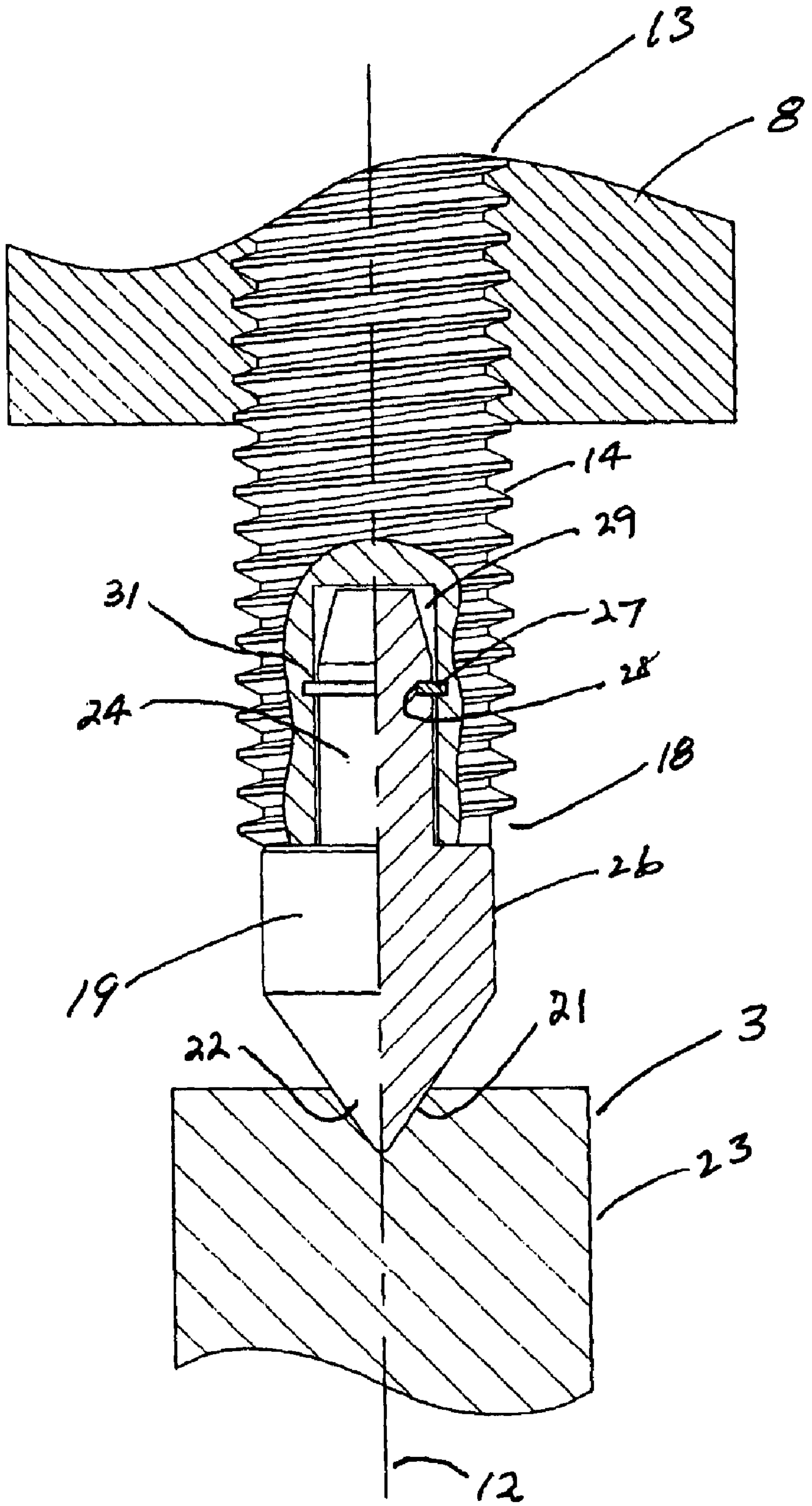
FIG. 4 is a part cross-sectional view illustrating the live center member of this invention in compressive engagement with the propellor shaft.

Referring to FIG. 4, the lower end 18 of bolt 14 carries a live center member 19 which preferably is heat treated steel having a Rockwell hardness of 65–70. The engagement end 21 of live center member 19 is conically shaped for insertion into centering recess 22 located on the distal end 3 of propellor shaft 23 where centering recess 22 is symmetrical to central axis 12. As can be further seen in FIG. 4, the live member center member is also symmetrical about central axis 12 and has a cylindrical pin portion 24 having a smaller diameter than, but integrally a part of, the cylinder portion 26 of the live center member 19. Cylindrical pin portion 24 is rotationally carried by bolt 14 adjacent its lower end 18. The rotational carriage is achieved by split-ring 27 captively seated in channel 28 that extends circumferentially in the outer surface of cylindrical pin portion 24 of the live center member; bolt 14 at its lower end 18 has an internal recess 29 for receiving cylindrical pin portion 24. The boundary wall defined by the internal recess 29 in bolt 14 has a circumferentially extending slot 31, into which split-ring 27 radially expands to captively hold live center member 19 in fixed axial relationship with bolt 14. The rotation of the bolt 14 when live member 19 becomes frictionally locked in centering recess 22 under compressive engagement with propellor shaft 23, is thus permitted to continue even though live center member 19 is in locked rotational relationship with the propellor shaft.

Figure 2:
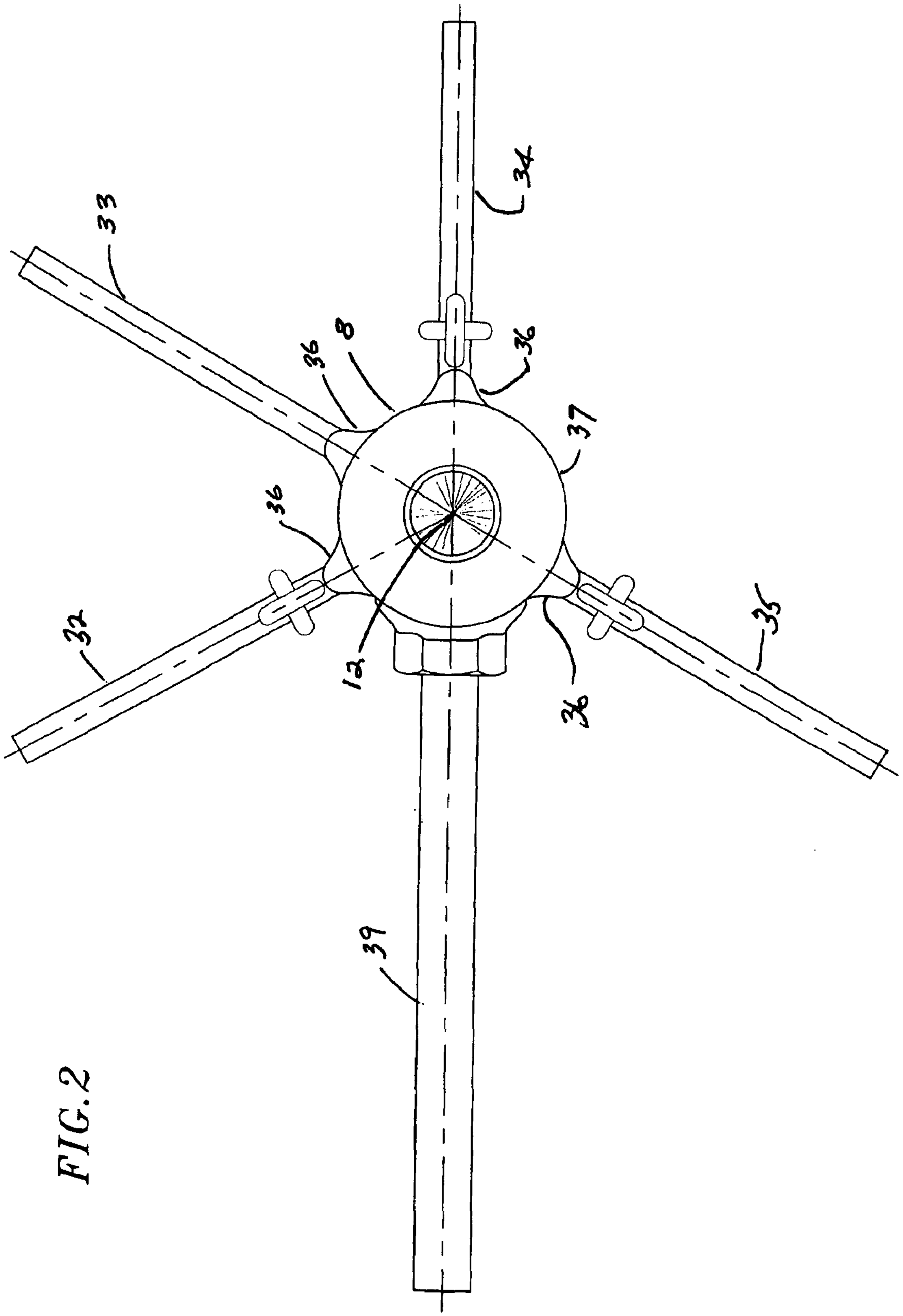
FIG. 2 is a top view of the hub base member of this invention illustrating the angular separation of the puller arms and the torque lever arm all extending radially from the hub base member.
Figure 3:
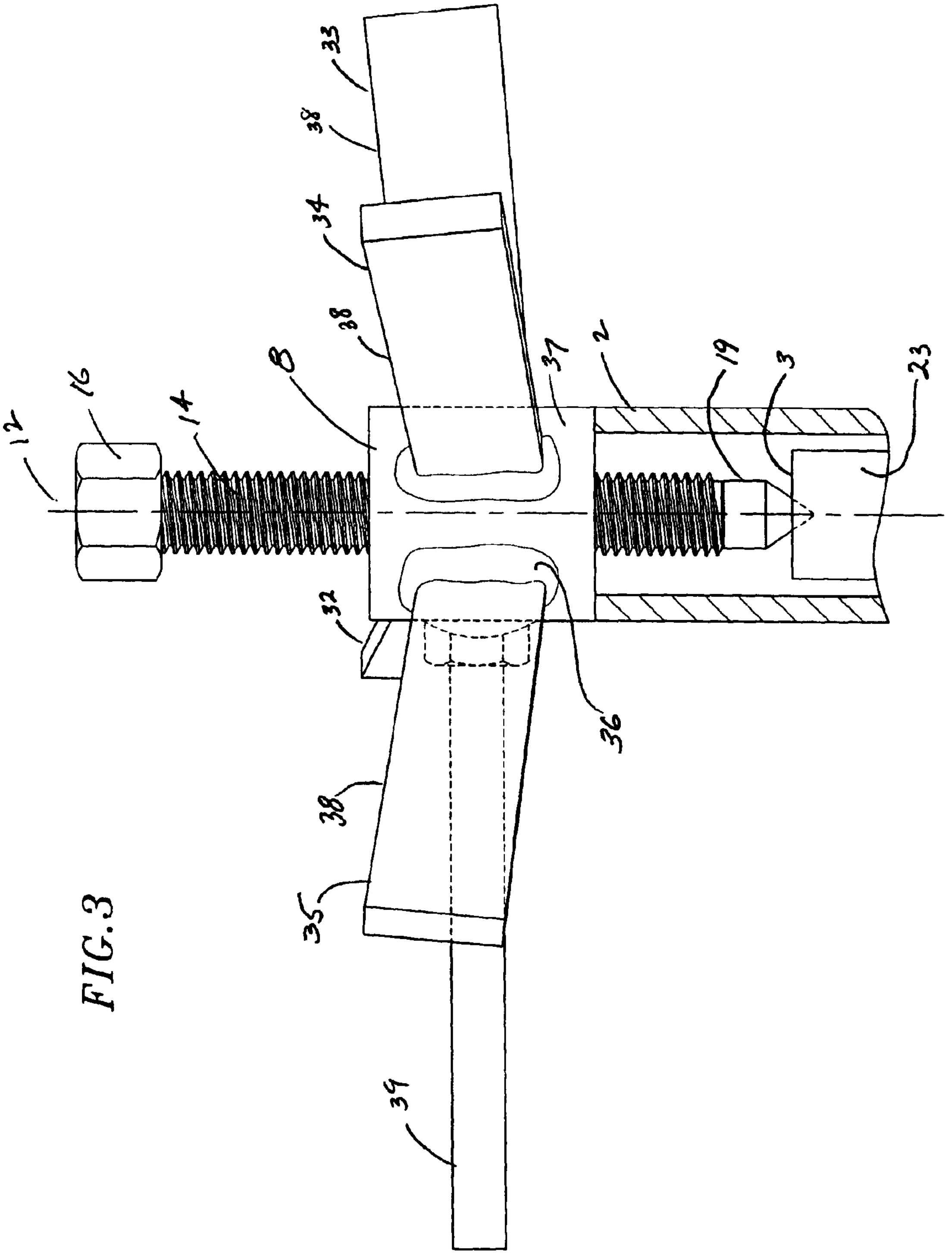
FIG. 3 is a partial cross-sectional view illustrating the hub base member and bolt of this invention threadably engaged and the live center member carried by the bolt in compressive engagement with the propellor shaft.

FIG. 2 illustrates the preferred embodiment of hub base member 8. As can be seen in FIG. 2, hub base member 8 has four radially spaced puller arms 32, 33, 34, and 35 extending radially from hub base member 8. In the preferred embodiment, the puller arms are welded 36 to the cylinder portion 37 of hub base member 8. Another embodiment for hub base member 8 is shown in FIG. 1. In this embodiment, hub base member 8 has three puller arms 32', 33' and 34'. Referring again to FIG. 2, central axis 12 is perpendicular to the page of FIG. 2 and, as can be seen, each of the puller arms 32, 33, 34 and 35, has a radial axis that intersects central axis 12 of the hub base member 8. In FIG. 3, puller arms 32, 33, 34 and 35 are shown in perspective, and as can be seen in FIG. 3, the puller arms have a rectangular cross-section and are inclined to central axis 12 where the upper face 38 of each puller arm is a smooth surface and is sloped downwardly in a direction toward central axis 12. Although the puller arms have been shown to have a rectangular cross-section, another cross-section would be suitable so long as there where a smooth surface to permit a sliding relationship with chain link 40 as illustrated in FIG. 1.

Rotation of bolt 14 in a clockwise direction, will cause hub base member 8 to rotate with bolt 14 unless rotation of the hub base member is restrained by applying an opposite torque to hub base member 8. Restraint of rotation of hub base member 8 is achieved through torque lever 39 which restrains hub base member 8 such that the hub base member remains in fixed angular relationship with propellor hub 2 as bolt 14 is rotated. However, as bolt 14 is rotated, hub base member 8 will be displaced axially with respect to propellor shaft 23 in a vertical direction along central axis 12 as bolt 14 is rotated clockwise.

In the preferred embodiment of hub base member 8 as shown in FIG. 2, puller arms 32, 34, and 35 are angularly displaced from each other by one hundred and twenty degrees to accommodate a propellor hub having three propellor blades. The preferred embodiment also accommodates a propellor hub that has two propellor blades that are angularly spaced one hundred and eighty degrees. As can be seen in FIG. 2, the puller arms 33 and 35 are angularly spaced by one hundred and eighty degrees. Thus, the preferred embodiment would be adaptable to accommodate propellor configurations of propellor hubs having two or three blades.

Referring again to FIG. 1, a plurality of flexible tension members 41 and 42 are illustrated, the flexible tension members have a series of chain links 40 where the engagement of the tension member with a puller arm is achieved by mounting the uppermost chain link to the puller arm so that it is in slidable relationship with the puller arm. At the opposing or bottom end of the series of chain links that form the tension member, a hook 43 is coupled to the bottom chain link for grasping the leaning edge 6 of a propellor blade. In the preferred embodiment of this invention, the number of tension members utilized for separating the propellor hub from the shaft will be the same as the number of blades. Thus, as illustrated in FIG. 2, in the preferred embodiment of the hub base member 8, puller arms 32, 34 and 35 are angularly spaced at angles of one hundred and twenty degrees and respectively carry a flexible tension member having a hook 43 at its bottom end and a chain link 40 at its upper end that is slidably carried by a respective puller arm. Thus, in operation, when an external torque is applied to bolt 14 to induce clockwise rotation, and an opposing torque applied by lever arm 39 so as to preclude rotation of hub base member 8, continued rotation of bolt 14 will displace hub base member 8 in a vertical axial direction placing the flexible tension members in tension. As compressive engagement begins to occur between live center member 19 and the distal end 3 of propellor shaft 23 the live center member will cease rotating with respect to the propellor shaft. As bolt 14 continues to rotate relative to live center member 19, vertical displacement of hub base member 8 will occur. This will place the flexible tension members in an increasing state of tension that increases the force acting through hook 43 on the propellor blade. As tension increases in the flexible tension members, chain link 40 will slide radially inwardly toward central axis 12 thereby permitting uniform distribution of the pulling forces acting on the propellor hub to separate the hub from the propellor shaft. Since no relative motion occurs between the live center member and the centering recess on the propellor shaft, no distortion occurs to the centering recess and thus a more uniform distribution of forces and moments are transmitted to the propellor hub to separate it from the propellor shaft.

While I have shown and described embodiments of an improved propellor pulling device for pulling a propellor having blades from the propellor shaft of a marine engine, it is to be understood that the invention is subject to many modifications without departing from the scope and spirit of the claims as recited herein.

What is claimed is:

1. An improved propellor puller device for pulling a propellor having blades from the propellor shaft of a marine engine, comprising:

(a) a hub base member having an upper end and a lower end, a central axis, and an axially extending bore therethrough;

(b) a bolt having a first end and a second end adapted for carriage by said hub base member within said bore in translational relationship such that upon rotation of said bolt said hub base member is displaced axially relative to said bolt where said bolt has an axially extending internal cylindrical recess having a boundary surface at said first end, and where said live center member further comprises a conical head portion for compressive engagement with said propellor shaft and a cylindrical shaft portion integral with said conical head portion, where said cylindrical shaft portion and said internal cylindrical recess are so dimensioned and proportioned to permit said cylindrical shaft portion to be captively held within said internal cylindrical recess and where said cylindrical shaft portion of said live center member has a cylindrical outer surface having a diameter less than the diameter of said internal cylindrical recess of said bolt and where said cylindrical outer surface of said cylindrical shaft portion has a circumferential slot, said internal cylindrical recess having a continuous circumferentially extending groove in said boundary surface;

(c) a live center member carried by said bolt adjacent said first end for compressive engagement with said propellor shaft upon sufficient rotation of said bolt and where said live center member is so adapted for carriage by said bolt to permit rotation of said bolt relative to said live center member when said live center member is in fixed rotational relationship relative to said propellor shaft;

(d) a multiplicity of puller arms carried in fixed relationship with said hub base member intermediate said upper end and lower end of said hub base member and extending radially therefrom;

(e) a plurality of flexible tension members where each said flexible tension member is associated with one of said multiplicity of puller arms and one of said propellor blades, respectively, for transmitting axially directed external forces to said propellor blades upon sufficient rotation of said bolt; and (f) a torque handle extending radially from said hub base member for applying a sufficient torque to said hub base member to preclude rotation of said hub base member upon rotation of said bolt and where said live center member further comprises a resilient split ring carried in said circumferential slot such that said resilient split ring may expand radially into said groove to preclude axial displacement of said live center member relative to said bolt.

2. A propellor puller device for pulling a propellor having blades from the propellor shaft of a marine engine comprising in combination:

(a) a hub base member having an upper end and a lower end, a central axis, and an axially extending bore therethrough, said hub member further having a multiplicity of puller arms carried in fixed relationship with said hub base member intermediate said upper end and lower end of said hub base member and extending radially therefrom, said hub base member further having a torque handle extending radially from said hub base member;

(b) a bolt having a first end and a second end adapted for carriage by said hub base member within said bore in translational relationship such that upon rotation of said bolt said hub base member is displaced axially relative to said bolt, where said bolt has an axially extending internal cylindrical recess having a boundary surface at said first end, and where said live center member further comprises a conical head portion for compressive engagement with said propellor shaft and a cylindrical shaft portion integral with said conical head portion, where said cylindrical shaft portion and said internal cylindrical recess are so dimensioned and proportioned to permit said cylindrical shaft portion to be captively held within said internal cylindrical recess;

(c) a live center member carried by said bolt adjacent said first end for compressive engagement with said propellor shaft upon sufficient rotation of said bolt and where said live center member is so adapted for carriage by said bolt to permit rotation of said bolt relative to said live center member when said live center member is in fixed rotational relationship relative to said propellor shaft, and where said cylindrical shaft portion of said live center member has a cylindrical outer surface having a diameter less than the diameter of said internal cylindrical recess of said bolt and where said cylindrical outer surface of said cylindrical shaft portion has a circumferential slot, said internal cylindrical recess having a continuous circumferentially extending groove in said boundary surface.

3. A propellor puller device for pulling a propellor having blades from the propellor shaft of a marine engine comprising in combination:

(a) a hub base member having an upper end and a lower end, a central axis, and an axially extending bore therethrough, said hub member further having a multiplicity of puller arms carried in fixed relationship with said hub base member intermediate said upper end and lower end of said hub base member and extending radially therefrom, said hub base member further having a torque handle extending radially from said hub base member;

(b) a bolt having a first end and a second end adapted for carriage by said hub base member within said bore in translational relationship such that upon rotation of said bolt said hub base member is displaced axially relative to said bolt, where said bolt has an axially extending internal cylindrical recess having a boundary surface at said first end, and where said live center member further comprises a conical head portion for compressive engagement with said propellor shaft and a cylindrical shaft portion integral with said conical head portion, where said cylindrical shaft portion and said internal cylindrical recess are so dimensioned and proportioned to permit said cylindrical shaft portion to be captively held within said internal cylindrical recess;

(c) a live center member carried by said bolt adjacent said first end for compressive engagement with said propellor shaft upon sufficient rotation of said bolt and where said live center member is so adapted for carriage by said bolt to permit rotation of said bolt relative to said live center member when said live center member is in fixed rotational relationship relative to said propellor shaft, and where said live center member further comprises a resilient split ring carried in said circumferential slot such that said resilient split ring may expand radially into said groove to preclude axial displacement of said live center member relative to said bolt.

* * * * *